Patented June 20, 1944

2,351,950

UNITED STATES PATENT OFFICE 2,351,950

METHOD OF PRESERVING VEGETABLES, FRUITS, AND SIMILAR VEGETABLE FOOD BY DRYING AND BRIQUETTING

Aage Gernow, Copenhagen, Denmark; vested in the Alien Property Custodian

No Drawing. Application April 16, 1942, Serial No. 439,293. In Denmark October 24, 1940

1 Claim. (Cl. 99—204)

Vegetables and fruits have for a long time been preserved by drying. Furthermore it is known, in view of the costs of packing and distribution, to compress the dried product in such manner as to reduce the air interspaces between the individual parts of the food. At the same time it results that the food to a certain degree is protected against taking up or giving off moisture, loss of aromatic substances and attack by fungus and mustiness or the like. For instance, it has been customary after laying dried fruits, such as figs, apricots and dates into their packing material to subject the same to pressure therein. However, by such means a tolerably good preservation is obtained only in connection with fruits very rich in sugar.

It is further known to press meat extract which has been reduced to powder, with addition of common salt or other crystalline as well as powdery and flour-like substances, into cubes or bodies of similar shapes. Besides the powderlike base, other basic substances, and also granular or comminuted ingredients such as dried vegetables in suitably chopped or cut form may be present in such mixtures. It is, however, the powdery basic mass as well as the meat extract and a possible content of salt which hold the mass together to solid pressed bodies.

For medical use, furthermore, highly dried and finely pulverized vegetables, such as spinach, have been pressed into small, compact and hard tablets or pills in which a part of the vitamin content of the raw material is preserved in durable form. Similar tablets or pills have also been manufactured as forage, generally however with a substantial content of some strongly binding substances, such as flour or blood.

These products are not suited as real food for human beings since upon softening the same with water they form an unattractive sludge.

The present invention relates to a method of preserving vegetables and fruits and similar vegetable food which in fresh state contain less than 20% dry substance, by a drying process followed by pressing the same into briquette form. This method according to the invention is characterized in that the dried material, in cut, chopped or other comminuted or granular form or in whole state, is pressed into briquettes of an apparent specific gravity of at least 1.1, preferably 1.2 or more. By apparent specific gravity is meant the weight of the briquette in grams divided by the volume of the pressed body in cubic centimetres (ccm.).

By preservation carried out in this way a pressed body is obtained such that when softened in water, the starting material will again appear in the original cut, chopped, comminuted, granular or whole form according to the nature of the material in question and suitable for the consumer.

In prior experiments for the preservation of vegetables by drying and pressing the same it was found, particularly in cases where the power of coherence was sufficient therefor, that the material could be stocked and distributed as briquettes, but that the material was not satisfactorily preserved since the vitamin content for instance was destroyed just as rapidly as in the corresponding non-briquetted dried material. A single exception was the above-mentioned tablets for medical use in weights of one or a few grams; however, even if the manufacture of larger briquettes from a similar pulverulent material is within the limits of technical possibility, this is, as already mentioned, of no interest on account of the unattractive form of the product in softened condition.

The present invention is in the first place based upon the observation that it is possible, in materials of kind and the form to which the invention relates, to wholly or partially preserve the valuable constituents against oxidation by increasing the apparent specific gravity by pressing the material to more than 1.1.

In the case of a material containing a certain quantity of constituents, for instance C-vitamin, which may be destroyed by oxidation, a preservation of these constituents may, for instance, be attained by preventing the access of air from outside to the material on the one hand and by bringing the material into a form on the other hand in which inherently the amount of air present is so small that the said constituents can not be damaged thereby. In pressing dried vegetables into briquette form the admission of air from outside may in a high degree be prevented by pressing the briquette in such a manner that its surface becomes smooth and tight. However, the last-named condition, i. e. sufficiently low content of air, has previously not been sufficiently observed.

Through a simple calculation an idea may be obtained as to how much air a briquette of vegetable should be allowed to contain, when one wishes to preserve the content of the food for instance of C-vitamins (ascorbinic acid).

The molecular weight of ascorbinic acid is 176 and 1 atom of oxygen is consumed for the oxidation of 1 molecule of ascorbinic acid to dehydroascorbinic acid. For the oxidation of 1 gram ascorbinic acid consequently $$\frac{1 \times 16 \times 22.4 \times 1000}{176 \times 32} = 64 \text{ cubic centimetres}$$

oxygen or 300 ccm. atmospheric air are consumed. Since 1 g. ascorbinic acid is equal to 20,000 international units (I. U.) of C-vitamin, 1 ccm. air can thus destroy 66 international units (I. U.).

It has been found that by pressing vegetables dried up to about 80% dry substance with a surface pressure of more than 1000 kg./sq. cm. for more than 15 minutes using a matrix, the specific gravity of the briquette cannot be raised substantially over 1.40. Such a briquette may be considered practically free from air and consequently said specific gravity then approaches the true specific gravity of the material. A briquette having the apparent specific gravity s contains consequently 100 (1—s:1.40) % air.

A briquette containing, for instance, 125 g. spinach of specific gravity 1.00 and 80% dry substance thus contains 29% or 125×0.29=36.3 ccm. air which is sufficient for destroying 36.3×66= 2400 I. U. C-vitamin.

Since spinach contains in average 15,000 I. U. C-vitamin per 100 g. dry substance and since it has been found by experiments that in drying more than 20% thereof remains preserved only under particularly favourable conditions, such a briquette will contain on an average 1500×0.20= 3000 I. U. per 100 g. dry substance.

Thus in the above-mentioned briquette of 125 g. containing 125×080=100 g. dry substance, the air present in the briquette is sufficient to destroy not less than 80% of its C-vitamin content.

Regarding the provitamins for A-vitamin the conditions are essentially different, since the content of these substances in vegetables and fruits according to weight is very low in comparison with the content of ascorbinic acid. For instance, spinach seldom contains more than 0.06 g. β-carotine per 100 g. dry substance and the oxygen consumption per gram of these substances is lower than in the oxidation of ascorbinic acid.

Carefully performed series of experiments with briquettes of dried spinach and different cabbages of a specific gravity of about 1.00 have shown that over a period of 6 months the content of C-vitamin and β-carotine in these briquettes was not preserved better than in the corresponding dried, but not briquetted material. The loss in percentage for the β-carotine was, however, not essentially higher than that for C-vitamin.

Only at an apparent specific gravity of more than 1.10, preferably about 1.20 or more, is the air content of the briquette small enough to effect substantial preservation of the vitamin content and other oxidizable constituents (for instance aromatic substances) and the present invention has therefore primarily for its object to press briquettes having such an apparent specific gravity. It has been found that thereby briquettes are attained which in most cases are denser and better than briquettes previously produced, even if it is possible to manufacture briquettes which are completely satisfactory in mechanical respects but which after expansion upon release of the pressure have an apparent specific gravity lying below 1.0. Briquettes from dried vegetables having an apparent specific gravity exceeding 1.10 are not known in the prior art.

For obtaining a briquette which upon said expansion still has an apparent specific gravity exceeding 1.10 it is necessary, however, to exercise such a pressure as to obtain a correspondingly higher apparent specific gravity.

In a long series of experiments it has now been found that in pressing briquettes which upon expansion have a specific gravity higher than 1.10, generally higher pressure and/or longer periods of pressing are required than are suitable for the practical manufacture of such briquettes in the industry. In some cases such a briquette cannot be obtained at all even if very high pressures and long pressing periods of time are used. To make possible the pressing of such briquettes while using tolerably moderate pressures below 1000 kg./sq. cm. and with not too long pressing periods, and further to make it possible to manufacture such briquettes in cases where it previously was impossible, certain measures have to be taken which also form an object of the present invention.

It has thus been found that for each material and each surface pressure there is an optimum content of dry substance by which a briquette of the highest specific gravity and the least expansion is obtained and that with higher pressure there is a higher optimum content of dry substance at which a higher specific gravity is obtained than at any lower values of content of dry substance and pressure. This fact will be explained by the following example:

In a series of experiments medium-grained spinach freed from the coarser ribs was dried to the dry substance content referred to hereinbelow, whereupon the dried material was pressed in a hydraulic press with manual pump in matrices at different surface pressures for 5 seconds into flat rectangular briquettes all weighing 125 g. and having a base surface of 65×125 millimeters (mm.). The table states the thickness of the briquettes produced in this way in millimeters, measured immediately upon the pressing process.

| Dry substance, percent | Surface pressure in kg./sq. cm. | | |
|---|---|---|---|
| | 250 | 500 | 1,000 |
| 74 | 12.8 | | |
| 77 | 12.6 | (¹) | |
| 84 | 13.6 | 12.8 | 12.5 |
| 86 | | 11.9 | 11.4 |
| 89 | 14.9 | 13.1 | 11.8 |
| 93 | | | 12.5 |

¹ The material was pressed between matrix and plunger.

From the above table it is evident that the optimum content of dry substance for 250, 500 and 1000 kg. per sq. cm. was 77, 86 (or somewhat lower) and 86 (or somewhat higher) respectively. In 48 hours these dry briquettes all expanded about 1.3 mm. and from the thickness after expansion the loss in C-vitamin can be calculated in the manner mentioned above provided that the briquette as assumed contains 2400 I. U. per 100 gram dry substance:

| | | | |
|---|---|---|---|
| Surface pressure kg./sq. cm. | 250 | 500 | 1,000 |
| Thickness after expansion | 13.9 | 13.2 | 12.7 |
| Specific gravity after expansion | 1.12 | 1.17 | 1.21 |
| Volume percentage of air | 20.0 | 16.5 | 13.5 |
| Air ccm | 20.4 | 15.8 | 12.4 |
| Vitamin content I. U. | 2,300 | 2,580 | 2,580 |
| Vitamin loss I. U. | 1,340 | 1,040 | 820 |
| Vitamin loss per cent | 58 | 40 | 32 |

By experiments it has further been found, that the losses do not exceed the figures calculated above.

The specific gravities of the briquettes obtained at the optimum content of dry substance can usually be increased by 3 to 6% by employing pressing periods of 30 seconds to 2 minutes or by subjecting the briquettes to an after-pressing in matrices for 5 to 15 minutes at a surface pressure below 50 kg. per sq. cm.

Briquettes having too low a content of dry substance are exposed to attacks by mould and at a content of dry substance essentially below the optimum content the product has a tendency to crack in the side surfaces whereby the air obtains access to the interior of the briquettes. This formation of cracks also takes place when the specific gravity of the briquettes, irrespective of the cracks, is relatively high. A surface pressure of about 200 kg./sq. cm. corresponds as a rule to that optimum content of dry substance which is the lowest which can be used for obtaining a durable briquette.

The more the content of dry substance exceeds the optimum content of dry substance the higher pressure has to be used for obtaining a briquette of equal specific gravity. It is, however, preferable to use comparatively low pressures because the press in this case may be of lighter construction, and the time for raising the pressure may be shortened and consequently the effect of the press made greater. The consideration of these facts leads to the conclusion that for each material there is a definite relatively high content of dry substance which preferably should not be exceeded. In the above example it should be 86% if 1000 kg./sq. cm. is taken as the highest surface pressure that is suitable for advantageous construction of presses. At contents of dry substance exceeding 90% very high pressures are required.

In briquetting green vegetables, such as spinach, one will find that a briquette pressed at the optimum content of dry substance is far darker than a briquette pressed under otherwise equal conditions from the same raw material but at a content of dry substance which is greater than the optimum content of dry substance (for spinach about 90%) corresponding to 1000 kg./sq. cm.

This darker colour depends evidently on the fact that the concentrated juice present in the dried plant tissue exudes therefrom and fills the air interspaces whereby the plant parts are stuck together to form a briquette of high specific gravity which expands only little even if it is pressed at relatively low pressure.

This explains the above-mentioned limits for the contents of dry substance, inasmuch as the juice has to be condensed at least to such a concentration that its viscosity affords the required stickiness (that it thus does not flow freely) but on the other hand must not be condensed to such an extent that the juice assumes a hard or even brittle consistency.

The higher the concentration of the juice is between these limits, the higher is its viscosity and the higher the pressure and the longer the pressing period which have to be employed in order to bring about the required dislocation of the condensed juice, which agrees with the above-mentioned relation between content of dry substance and pressure.

The spinach used for the above-mentioned briquetting experiments contained 7.2% dry substance and the juice squeezable from the fresh spinach still contained 3.6% dry substance after filtration. The dry substance of the juice amounted consequently to about 50% of the total dry substance and it can be said that the amount of the binding medium was nearly 100% of the solid mass to be briquetted.

The higher this percentage of binding medium is for solid masses of the same constant nature the lower the pressure that can be used in the briquetting process. This is clearly apparent for instance with white cabbage which has more than 70% binding medium in the autumn and can then easily be briquetted at 200 kg./sq. cm. while white cabbage stored in the cellar over one winter has only 30 to 40% binding medium and therefore requires 500 kg./sq. cm. or more in order that an exudation of juice can take place and a briquette of high specific gravity be obtained.

On the other hand briquettes having too high a content of binding medium become soft and flexible. This is for instance the case with fruits having high sugar content and relatively low content of solids.

Whether a certain material can be briquetted according to the present method depends however above all upon the nature of the solids. If thus the solids contain larger amounts of ducts and supporting tissues and the like or if the tissue is lignified this will cause the briquette to show a strong tendency to expand immediately upon pressing as well as after some hours or days.

The higher the percentage of such expanding constituents is the higher the percentage of binding medium has to be in order that the material shall be pressable to a briquette having high specific gravity. As an example it can be stated that carrots in their capacity of roots have a rather fibrous tissue but that this feature will be balanced by the rather great content of sugar of the juice so that in any case young carrots render compact briquettes.

As is known the number and the coarseness of the fibres increase with the age of the plant. Young plants are therefore throughout easier to briquette according to the method described herein than older plants of the same species. Also the material to be briquetted should preferably be free from coarse ribs.

It is not advantageous in the briquetting process to increase the pressure too rapidly since in such case it may be necessary to use longer pressing periods or essentially higher surface pressures for obtaining briquettes of the desired specific gravity. It is, as a rule, not suitable to let the surface pressure rise faster than 100 kg./sq. cm./sec.

As in the previously mentioned case of the relation between content of dry substance and surface pressure, this may be explained by the presence of a concentrated juice of high viscosity. Its displacement must in fact take place more slowly at high pressure since the interspaces in which this juice must flow are narrowed. Although much more strongly the same conditions prevail in the pressing of oil out of oleaginous seed.

What I claim is:

A method of preserving vegetables, fruits and similar vegetable foodstuffs which contain in the fresh state less than 20% dry substance which comprises drying the material to be preserved until its content of dry substance is in the range of 70% to 90%, then pressing the dried material into a briquette with a surface pressure between 200 and 1000 kilograms per square centimeter, the dry substance content being adjusted to a value which is optimum at the pressure to be employed for producing high specific gravity in the briquette, said optimum value progressively increasing within the limits of said range as the pressure to be employed is increased from 200 to 1000 kilograms.

AAGE GERNOW.